(12) United States Patent
Meyers et al.

(10) Patent No.: US 8,203,698 B2
(45) Date of Patent: Jun. 19, 2012

(54) CONTROL MODULES FOR LASER SYSTEMS HAVING AUTO-RANGING AND CONTROL CAPABILITY

(75) Inventors: Brad E. Meyers, Issaquah, WA (US); David C. Shannon, Woodinville, WA (US); Scott Straka, Kirkland, WA (US)

(73) Assignee: B.E. Meyers & Co. Inc., Redmond, WA (US)

( * ) Notice: Subject to any disclaimer, the term of this patent is extended or adjusted under 35 U.S.C. 154(b) by 303 days.

(21) Appl. No.: 12/195,804

(22) Filed: Aug. 21, 2008

(65) Prior Publication Data

US 2009/0219962 A1    Sep. 3, 2009

Related U.S. Application Data

(63) Continuation-in-part of application No. 12/039,715, filed on Feb. 28, 2008.

(51) Int. Cl.
*G01C 3/08* (2006.01)
(52) U.S. Cl. ........... 356/5.01; 356/3.1; 356/4.1; 356/5.1
(58) Field of Classification Search ........ 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,612,883 A * | 3/1997 | Shaffer et al. | 701/300 |
| 5,837,918 A | 11/1998 | Sepp | |
| 2002/0071126 A1 * | 6/2002 | Shirai et al. | 356/614 |
| 2002/0154498 A1 | 10/2002 | Cramer et al. | |
| 2005/0083798 A1 | 4/2005 | Fujiune et al. | |
| 2005/0195383 A1 * | 9/2005 | Breed et al. | 356/4.01 |
| 2006/0209912 A1 | 9/2006 | Luo et al. | |
| 2007/0021915 A1 * | 1/2007 | Breed et al. | 701/301 |
| 2007/0069664 A1 | 3/2007 | Robinson et al. | |
| 2007/0274353 A1 | 11/2007 | Hauck et al. | |
| 2008/0205818 A1 * | 8/2008 | Kane et al. | 385/16 |

FOREIGN PATENT DOCUMENTS

EP    1744413    6/2006

OTHER PUBLICATIONS

E. Roisse et al. "Intracavity frequency-tripling of actively mode-locked diode-pumped Nd:YAG laser", 1999, 89-91, vol. 69, Applied Physics B.

* cited by examiner

*Primary Examiner* — Luke Ratcliffe
(74) *Attorney, Agent, or Firm* — McKenna Long & Aldridge LLP

(57) ABSTRACT

Control modules for automatically adjusting a laser output based on a range to an object detected within a field of view are disclosed.

20 Claims, 7 Drawing Sheets

CONTROL MODULES FOR LASER SYSTEMS HAVING AUTO-RANGING AND CONTROL CAPABILITY

CROSS REFERENCE TO RELATED APPLICATIONS

This patent application is a continuation-in-part application of co-pending, commonly-owned U.S. patent application Ser. No. 12/039,715 entitled "Laser Systems and Methods having Auto-Ranging and Control Capability" filed on Feb. 28, 2008, which application is incorporated herein by reference.

FIELD OF THE INVENTION

The present disclosure is directed to laser control systems, and more particularly, to control modules for automatically adjusting a laser output based on a range to an object detected within a field of view.

BACKGROUND OF THE INVENTION

Laser systems are used in a wide variety of civilian and military applications. Laser systems may be used, for example, for illuminating objects, determining distances (or ranging), detecting events, targeting objects, communications, and for a wide variety of other purposes. Recently, high-intensity laser illumination (or "dazzling") has been used in various security-related applications (e.g. military checkpoints, border crossings, access control stations, etc.) and has proven to be an effective deterrent of potentially-hostile activity, thereby promoting stability and saving lives.

As is generally known, laser systems are not entirely without risk to human vision. Many applications require laser systems to be operated at power levels that may be considered detrimental to human vision. One generally-accepted criterion for assessing whether a laser is operating at a power level detrimental to human vision is known as the Nominal Ocular Hazard Distance (NOHD). Because a power density of a laser's output decreases with increasing distance from the laser due to beam spreading, a particular laser power level may be considered safe at longer ranges, but may become hazardous within a certain operating range near the laser. The NOHD defines a near-range exposure danger zone for human vision.

In many situations that involve relatively high power laser systems, protection protocols and systems have been developed that attempt to minimize harmful exposure to laser irradiation that may be detrimental to human vision. Such protocols and systems may include, for example, mandatory use of laser-safe goggles, laser beam enclosures (particularly within the NOHD), door-lock systems that automatically shut off laser systems upon entry, and various other safety measures. Although desirable results have been achieved, there are situations where the use of such conventional safety systems and protocols may be impractical or impossible.

SUMMARY

The present disclosure teaches control modules for automatically adjusting a laser output (e.g. intensity, output power, etc.) based on a range to an object detected within a field of view to reduce a potential risk to the object. Embodiments of systems and methods in accordance with the teachings of the present disclosure may advantageously enhance the safety of laser operations in a variety of conditions and circumstances where conventional safety methods and protocols are impractical or impossible to implement.

For example, in one embodiment, a control module assembly for adjusting an output of a laser includes an emitter configured to emit a ranging beam toward a target; a detector configured to receive a reflected beam from the target; and a control module operable to communicate with the emitter and the detector to determine a distance to the target, to determine a reference distance based on one or more operating conditions of the laser, to compare the distance to the target with the reference distance, and based on the comparison to provide a control signal to controllably adjust one or more aspects of the laser output to provide an improved comparison between the distance to the target and the reference distance.

Similarly, in another embodiment, a method for adjusting an output of a laser includes emitting a ranging beam toward a target; receiving a reflected beam from the target; determining a distance to the target; determining a reference distance based on one or more operating conditions of the laser; comparing the distance to the target with the reference distance; and based on the comparison, controllably adjusting one or more aspects of the operating conditions of the laser to provide an improved comparison between the distance to the target and the reference distance.

BRIEF DESCRIPTION OF THE DRAWINGS

Embodiments of the present disclosure are described in detail below with reference to the following drawings.

DETAILED DESCRIPTION

The present disclosure is directed to laser systems and methods having an ability to automatically adjust a laser output based on a range to an object detected within a field of view. Many specific details of certain embodiments in accordance with the present disclosure are set forth in the following description and in FIGS. 1-11 to provide a thorough understanding of such embodiments. One skilled in the art, however, will understand that the present invention may have additional embodiments, or that the invention may be practiced without several of the details described in the following description.

Figure 1:
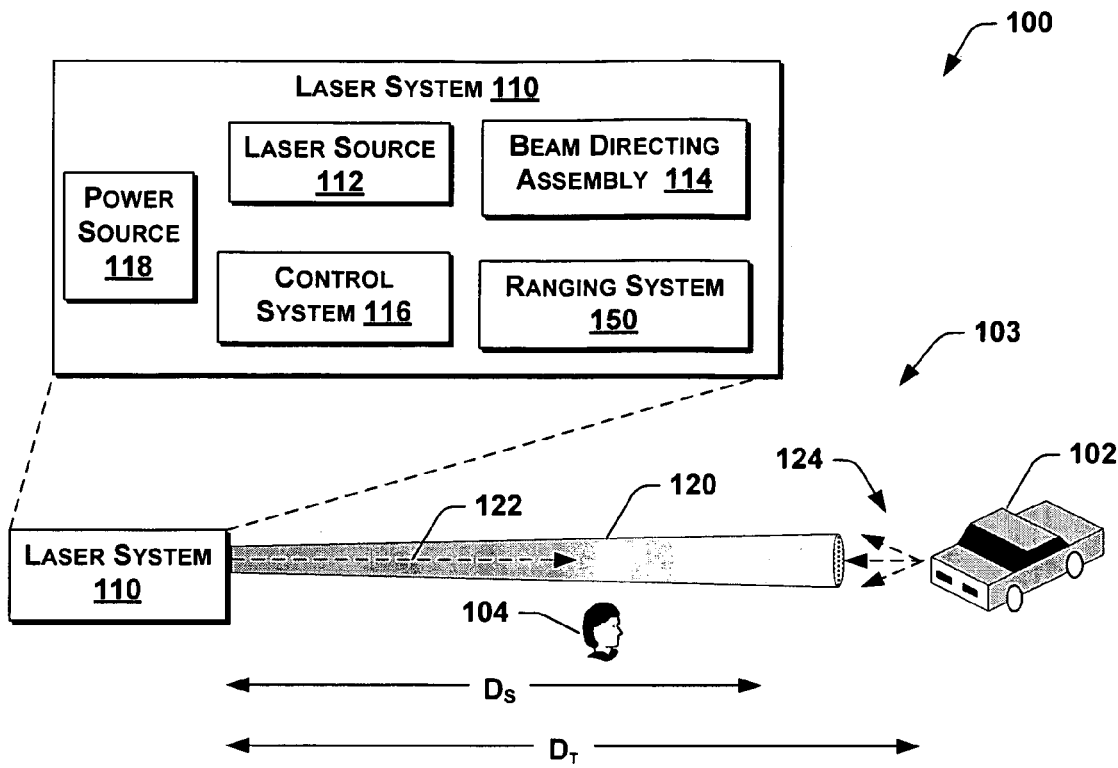
FIG. 1 is an exemplary environment having a laser system in a first operating condition in accordance with an embodiment of the present disclosure.

FIG. 1 is an exemplary environment 100 having a laser system 110 in accordance with an embodiment of the present disclosure. In a first operating condition 103, the laser system 110 directs a laser beam 120 along a beam axis 122 toward a target 102. The laser beam 120 may be a pulsed or non-pulsed laser beam 120. As depicted by the gradually-decreasing shading of the laser beam 120, an intensity (or power density) of the laser beam 120 generally decreases with increasing distance from the laser system 110 (e.g. due to beam spreading, absorption, etc.). At least part of the laser beam 120 that impinges on the target 102 is reflected as target reflections 124 (specular or non-specular) from the target 102. In the first operating condition 103, an intermediate object 104 (e.g. a bystander) is positioned generally outside of the laser beam 120.

Although the exemplary environment 100 shown in FIG. 1 depicts the target 102 as a vehicle, it will be appreciated that in alternate embodiments, the target 102 may be any type of object (military or civilian) that may be illuminated with the laser system 110, including a person, a building, a natural landscape, a watercraft, an aircraft, or any other suitable object. Similarly, the laser beam 120 may be configured for a variety of purposes, including, for example, to illuminate the target 102, to "dazzle" the target 102 (or occupants thereof), for targeting or aiming a weapon system (not shown), for inflicting damage on the target 102, or for any other suitable purpose.

In the embodiment shown in FIG. 1, the laser system 110 includes a laser source 112 and a beam directing assembly 114 that cooperatively generate and condition the laser light that ultimately forms the laser beam 120. A ranging system 150 is configured to determine a distance (or range) $D_T$ to the target 102. A control system 116 is configured to transmit control signals to one or more of the other components of the laser system 110, including the laser source 112 and the beam directing assembly 114. The control system 116 is also configured to receive signals from one or more of the other components of the laser system 110, including the ranging system 150. In some embodiments, the laser system 110 also includes a power source 118 (e.g. a battery), such as may be desired for a portable laser system, however, in alternate embodiments, the laser system 110 may rely on an external power source (not shown).

The ranging system 150 may be based on a variety of conventional ranging methods and techniques. For example, in some embodiments, the ranging system 150 may be configured to receive at least a portion of the target reflections 124 from the target 102, and may include a time-of-flight (TOF) system that clocks the time required for a portion of the laser beam 120 (e.g. a laser pulse) emitted by the laser system 110 to travel to the target 102, reflect from the target 102, and travel back to the ranging system 150, given by:

$$\text{Time}=(2D_T/c_{air})=6.681 \text{ nsec/m} \quad (1)$$

where $c_{air}$ is the speed of light through air, and $D_T$ is a distance between the laser system 110 and the target 102 (or target distance). Thus, the target distance $D_T$ may be determined by:

$$D_T=(\text{Time } c_{air})/2=0.1497 \text{ m/nsec} \quad (2)$$

In alternate embodiments, the ranging system 150 may be based on other suitable ranging methods, including triangulation, modulation, or any other ranging technologies. In further embodiments, the ranging system 150 need not be based on any portion of the laser beam 120 (e.g. a laser pulse), but rather, may be independent from the laser beam 120. For example, in some embodiments, the ranging system 150 may be based on sonic (or acoustic) signals, ultrasonic signals, non-laser light signals, including signals from any suitable portion of the electromagnetic spectrum, imaging technologies, or even various non-signal-based technologies for determining range and distance (e.g. Global Positioning System technologies, physical contact sensors, etc.). Representative examples of suitable ranging technologies that may be used by the ranging system 150 include, but are not limited to, those technologies generally described in U.S. Pat. No. 7,317,872 issued to Posa et al., U.S. Pat. No. 7,271,761 issued to Natsume et al., U.S. Pat. No. 7,075,625 issued to Abe, U.S. Pat. No. 7,154,591 issued to Muenter, U.S. Pat. No. 6,697,146 issued to Shima, and U.S. Pat. No. 5,336,899 issued to Nettleton et al.

With continued reference to FIG. 1, a standoff distance $D_S$ is shown. The standoff distance $D_S$ may depend on various factors of the environment 100, such as the operating conditions and purpose of the laser beam 120, the range and identity of the target 102, the presence and identity of the bystander 104, or any other factors. In some embodiments, for example, the standoff distance $D_S$ may be based on a desire to avoid a potential hazard to human vision. More specifically, the standoff distance $D_S$ may be approximately equal to (or based on) a Nominal Ocular Hazard Distance (NOHD). Of course, in alternate embodiments, other criterion for establishing the standoff distance $D_S$ may be used.

In some embodiments, operation of the laser system 110 may begin by activating the laser system 110 to provide the laser beam 120 directed toward the target 102 to perform the desired functionality. The standoff distance $D_S$ may be established by the operating conditions of the laser system 110, and may initially be assumed to compare favorably with the target distance $D_T$. The ranging system 150 may then determine the target distance $D_T$, either simultaneously or sequentially with the generation of the laser beam 120.

The laser system 110 may then compare the target distance $D_T$ with the standoff distance $D_S$ (e.g. using the control system 116). If the target distance $D_T$ compares favorably with the standoff distance $D_S$ (e.g. target distance $D_T$ exceeds standoff distance $D_S$), the laser system 110 may continue providing the laser beam 120 without making any adjustments to the laser system 110. Alternately, if the target distance $D_T$ compares unfavorably with the standoff distance $D_S$ (e.g. target distance $D_T$ does not exceed standoff distance $D_S$), the laser system 110 may perform adjustments to the operating conditions of the laser system 110 (and thus the standoff distance $D_S$) until a favorable comparison is achieved.

More specifically, in some embodiments, the laser system 110 (e.g. using the control system 116) may controllably adjust one or more portions of the laser system 110 to adjust the laser beam 120, and thus the standoff distance $D_S$, until the target distance $D_T$ meets or exceeds the standoff distance $D_S$. For example, the control system 116 may adjust an output power of the laser source 112, or one or more portions of the beam directing assembly 114 (e.g. beam conditioning optics, attenuators, etc.), or both the laser source 112 and the beam directing assembly 114, to adjust the standoff distance $D_S$. In further embodiments, other portions of the laser system 110 may be adjusted to provide a desired standoff distance $D_S$. As operations continue, the laser system 110 may continue to monitor the target distance $D_T$, and continue to controllably adjust the laser operating conditions so that the standoff distance $D_S$ continues to compare favorably with the target distance $D_T$.

In some embodiments, the laser system 110 may begin operating in a different way. More specifically, the operation of the laser system 110 may begin by having the ranging system 150 determine the target distance $D_T$ (e.g. by "pinging" the target 102). Based on the target distance $D_T$, the laser system 110 may initiate the laser beam 120 so that the target distance $D_T$ compares favorably with the standoff distance $D_S$. For example, in some embodiments, the standoff distance $D_S$ may be established based on a desire to avoid potential hazards to human vision. In such cases, the standoff distance $D_S$ may be based on the NOHD, and the laser system 110 may controllably generate the laser beam 120 so that the standoff distance $D_S$ is less than (or equal to) the target distance $D_T$.

In still other embodiments, the operating conditions may be set so that the standoff distance $D_S$ may initially assume a reasonably small value. The laser system 110 may then be operated to generate and direct the laser beam 120 toward the target 102, and the ranging system 150 may be operated, either simultaneously or sequentially with the presence of the laser beam 120, to determine the target distance $D_T$. The laser system 110 (e.g. via the control system 116) may determine whether the target distance $D_T$ compares favorably or unfavorably with the standoff distance $D_S$, and may perform adjustments to laser beam 120 accordingly.

Figure 2:
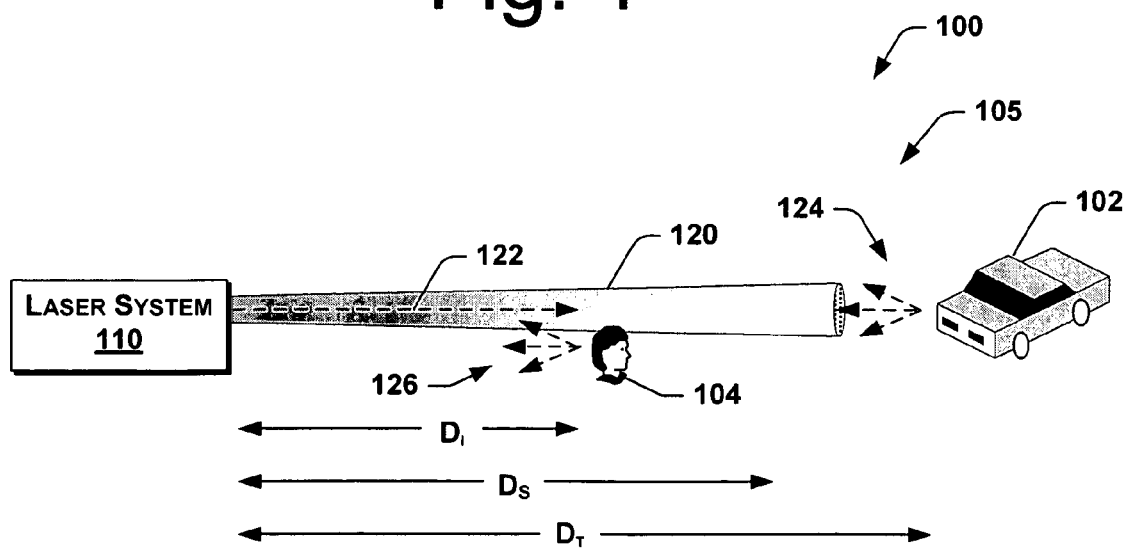
FIGS. 2-4 show the exemplary environment of FIG. 1 having the laser system in second, third, and fourth operating conditions, respectively.

FIG. 2 shows the laser system 110 in a second operating condition 105 wherein the intermediate object (or bystander) 104 has recently moved into the laser beam 120. In the second operating condition 105, at least part of the laser beam 120 that impinges on the intermediate object 104 is reflected as intermediate reflections 126. The ranging system 150 automatically determines an intermediate distance $D_I$ between the laser system 110 and the intermediate object 104, and the control system 110 compares the intermediate distance $D_I$ with the standoff distance $D_S$. In the second operating condition 105 shown in FIG. 2, the intermediate distance $D_I$ is less than the standoff distance $D_S$, and thus compares unfavorably with the standoff distance $D_S$. More specifically, in some embodiments, the bystander 104 has entered the NOHD portion of the laser beam 120 (i.e. the near-range exposure danger zone for human vision).

Figure 3:
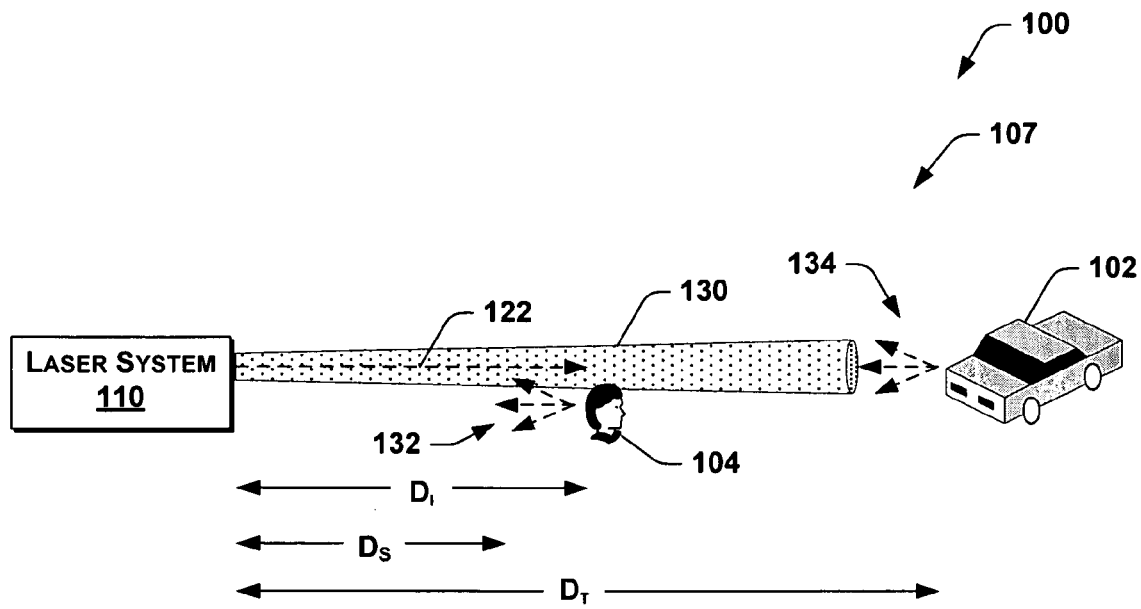

In a third operating condition 107 shown in FIG. 3, the laser system 110 has automatically adjusted the standoff distance $D_S$ based on the presence of the intermediate object 104. More specifically, the laser system 110 has automatically adjusted one or more portions of the laser system 110 to provide an adjusted laser beam 130 such that the intermediate distance $D_I$ meets or exceeds the standoff distance $D_S$. Although the third operating condition 107 shown in FIG. 3 depicts that laser system 110 as providing the adjusted laser beam 130, it will be appreciated that in some embodiments, it may be necessary to completely shut down the laser system 110 in the third operating condition 107 so that the intermediate distance $D_I$ compares favorably with the standoff distance $D_S$.

Figure 4:
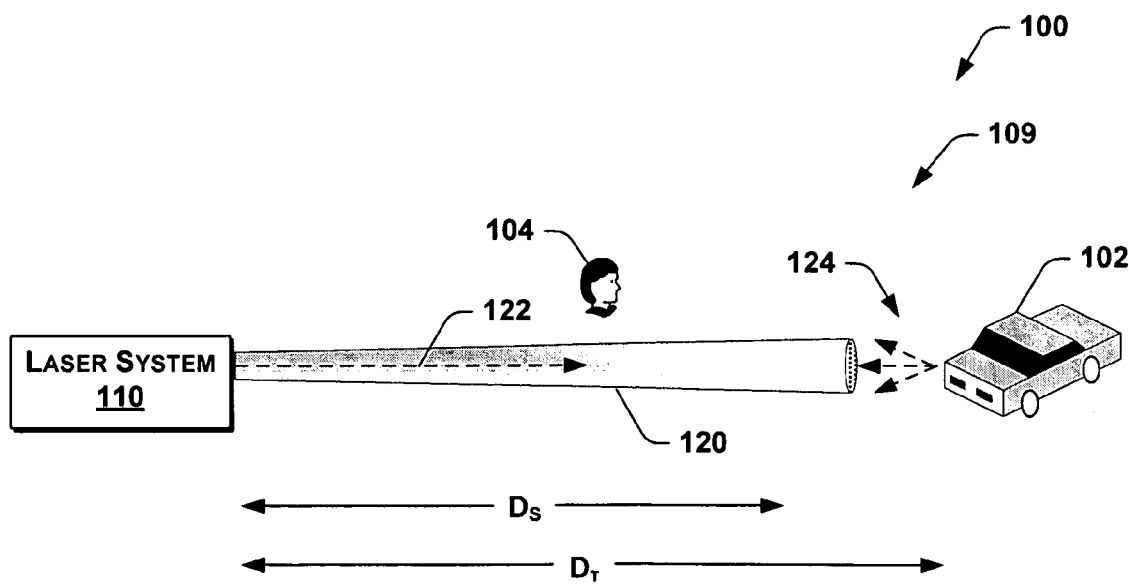

In a fourth operating condition 109 shown in FIG. 4, the bystander 104 has moved out of the laser beam 130. The ranging system 150 automatically determines that the bystander 104 is no longer within the laser beam 130 (or other specified field-of-view), and that the closest object within the laser beam 130 is once again the target 102. Based on the target distance $D_T$, the laser system 110 automatically adjusts the laser beam 120 (and thus the standoff distance $D_S$) back to the initial operating condition 103. In the fourth operating condition 109, the laser system 110 continues to provide the laser beam 120 to perform the desired function, and may continue to monitor and adjust the operating conditions so that the target distance $D_T$ compares favorably with the standoff distance $D_S$.

Embodiments of systems and methods in accordance with the present disclosure may provide substantial advantages over conventional laser systems. For example, systems and methods having an ability to automatically adjust a laser output based on a range to an object detected within a field of view may promote safety in a wider range of operating environments in comparison with conventional systems. Because such systems may automatically detect the presence of an intermediate object, and may automatically adjust the laser system to ensure that the intermediate object is outside the standoff distance, embodiments in accordance with the present disclosure may enhance the safety of laser operations in a variety of conditions and circumstances where conventional safety methods and protocols are impractical or impossible to implement. Embodiments in accordance with the present disclosure may also enhance the safety of laser operations at substantially-reduced cost, and with improved reliability, in comparison with conventional alternatives.

Figure 5:
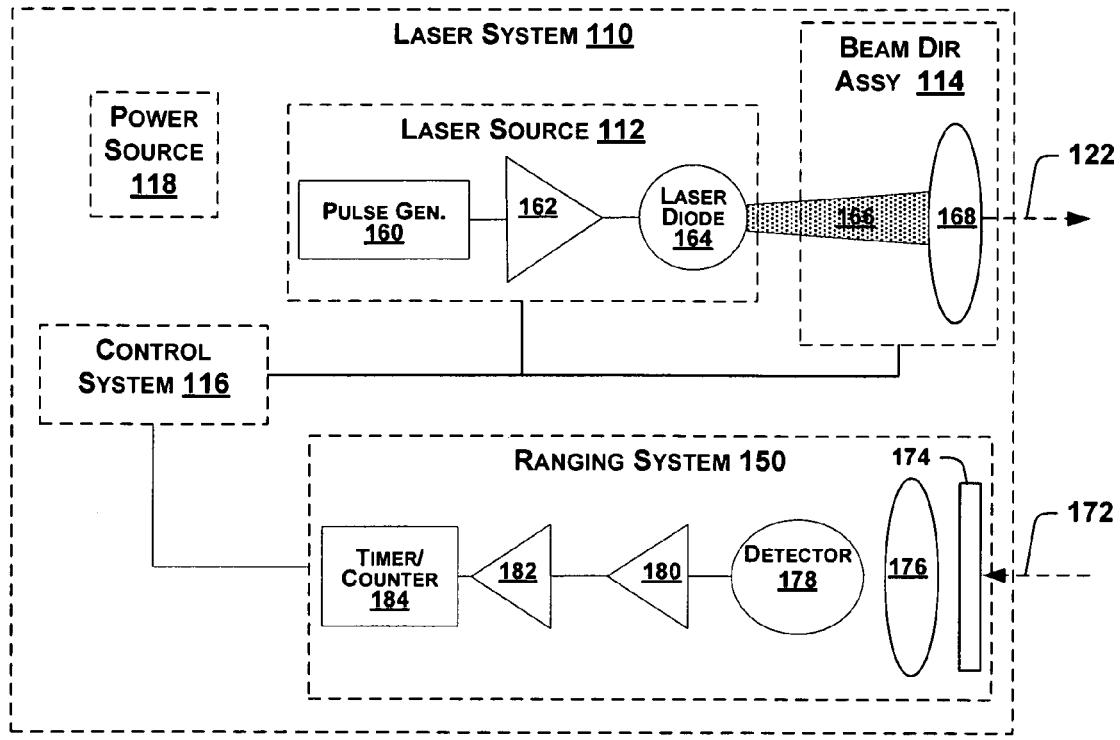
FIG. 5 is a schematic view of the laser system of FIG. 1 in accordance with another embodiment of the present disclosure.

It will be appreciated that a variety of suitable embodiments of the laser system 110 may be conceived that provide the desired operability in accordance with the teachings of the present disclosure. For example, FIG. 5 is a schematic view of one possible embodiment of the laser system 110 of FIG. 1. In this embodiment, the laser source 112 includes a pulse generator 160 coupled to a laser driver 162. A laser diode 164 is driven by the laser driver 162 to provide a laser light 166 to the beam directing assembly 114. One or more conditioning optics 168 of the beam directing assembly 114 condition the laser light 166 to provide a collimated laser beam along the beam axis 122.

In some implementations, the components of the laser system 110 may be configured to provide a pulsed laser light 166 at controlled current levels. For example, the pulses of laser light 166 may be adjustably varied within a range of approximately 10 nsec to approximately 50 nsec. Of course, in alternate embodiments, pulses of any other suitable duration may be employed.

With continued reference to FIG. 5, in this embodiment, the ranging system 150 receives a reflected portion 172 of the emitted laser beam that reflects from the distal target 102 or the intermediate object 104. The reflected portion 172 passes through an optical bandpass filter 174 and one or more conditioning optics 176 of the ranging system 150 before impinging upon a detector 178. In some embodiments, the detector 178 may include a photodiode, an avalanche photodiode, a photo-detector, or any other suitable detection device. Output signals from the detector 178 may be conditioned by an amplifier 180 and by an automatic gain control (AGC) component 182. The AGC component 182 conditions the output signals so that, despite variations in the input level (e.g. the reflected portion 172), the average level of the output from the AGC component 182 are approximately at a predetermined value (or within a predetermined range). A timer (or counter) 184 receives the output signals from the AGC component 182 and determines the target distance $D_T$ using, for example, Equation (2) above.

Figure 6:
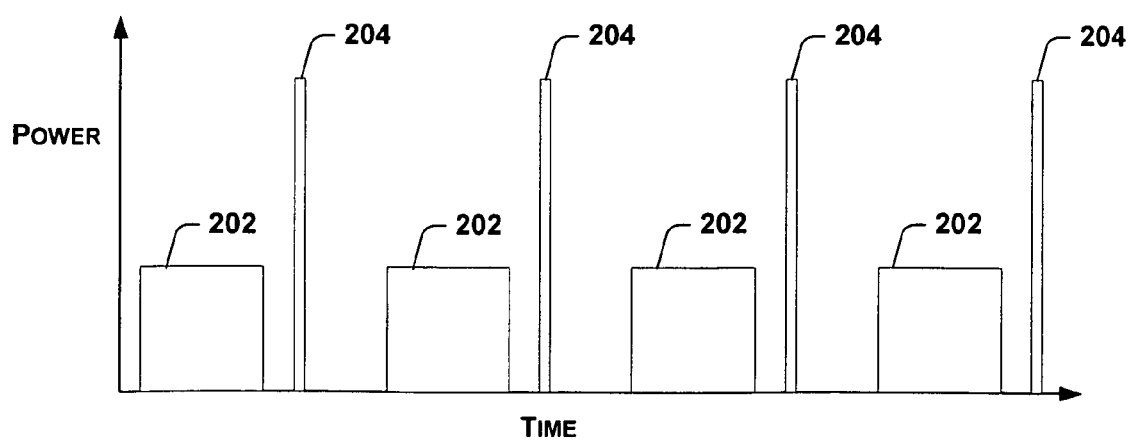
FIG. 6 is an exemplary laser power time history of the laser system of FIG. 5 in accordance with an alternate embodiment of the present disclosure.

FIG. 6 is an exemplary laser power time history 200 of the laser system 110 of FIG. 5. In this embodiment, the time history 200 includes a series of alternating illumination pulses 202 and ranging pulses 204. The ranging pulses 204 are of higher intensity and shorter duration than the illumination pulses 202, and are configured to operate as the source of the reflected signals 172 received by the ranging system 150. Similarly, the illumination pulses 202 are configured to perform the intended purpose of the laser system 110 with respect to the target 102 (e.g. illuminate, "dazzle," aim, damage, etc.).

Figure 7:
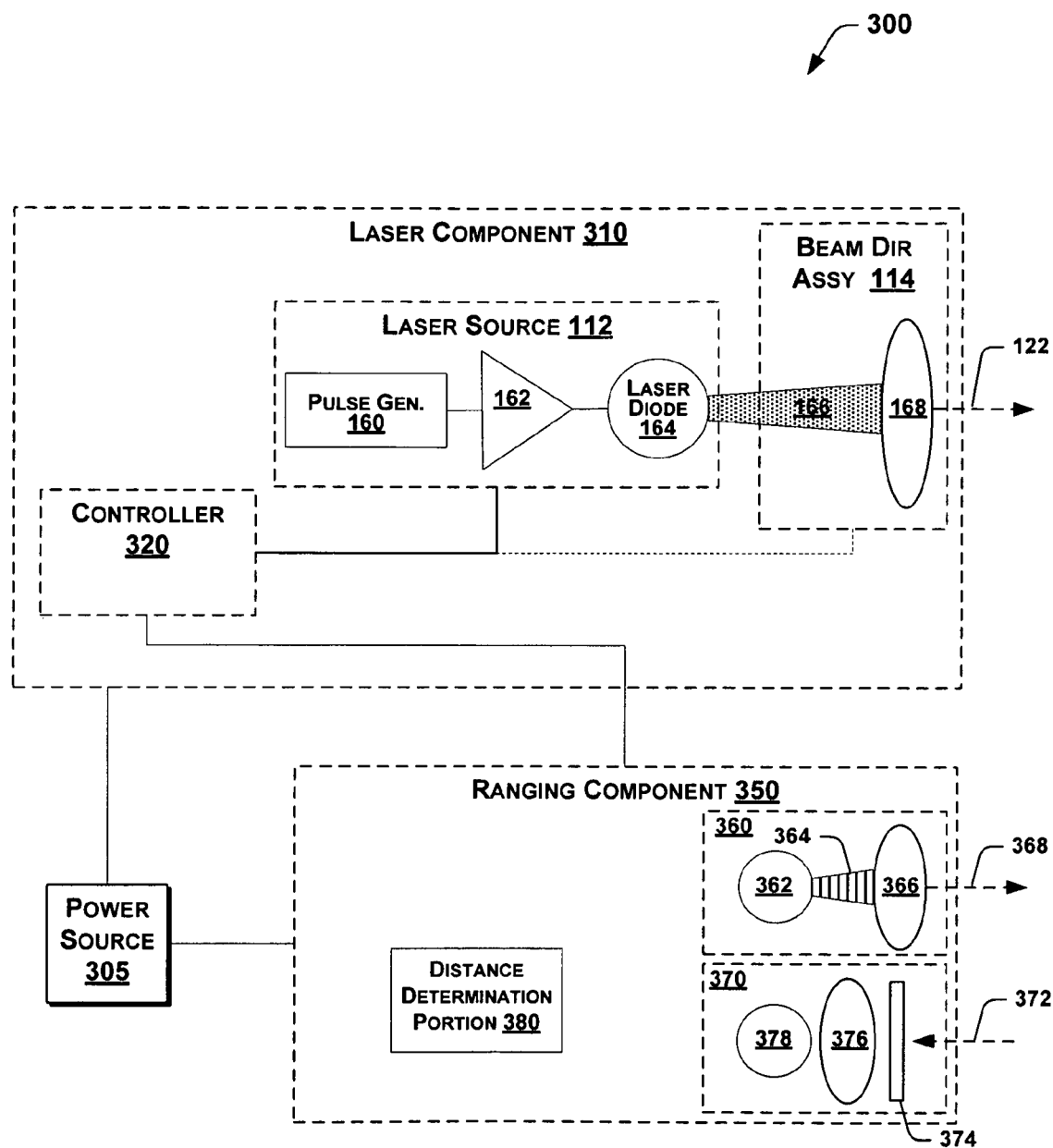
FIG. 7 is a schematic view of a laser system in accordance with another alternate embodiment of the present disclosure.

FIG. 7 is a schematic view of a system 300 in accordance with another alternate embodiment of the present disclosure. In this embodiment, the system 300 includes a laser component 310 and a ranging component 350 powered by an external power source 305. The laser component 310 includes a laser source 112 and a beam directing assembly 114 having substantially the same structural components and functionality as described above with respect to FIG. 5. A controller 320 controls the laser source 112 and the beam directing assembly 114 to provide a laser output 122 toward a distal target (not shown).

The ranging component 350 is operatively coupled to the laser component 310 and includes a signal generation portion 360, a signal detection portion 370, and a distance determination portion 380. In this embodiment, the signal generation portion 360 includes a source 362 that emits signals 364 into a signal conditioner 366. A ranging signal 368 is transmitted from the signal generation portion 360 toward a distal object within a field of view of the ranging component 350.

As further shown in FIG. 7, a portion of the ranging signal 368 is reflected back from the distal object as a return signal 372. The return signal 372 passes through a first signal conditioner 374 (e.g. a filter), a second signal conditioner 376 (e.g. focusing optics), and arrives to a detector 378. The distance determination portion 380 receives an output from at least the signal detection portion 370 and determines the range to the distal object. The ranging component 350 outputs the range to the laser component 310 (e.g. to the controller 320), and continues performing ranging of distal objects within the field of view. Thus, the above-described advantages of laser systems and methods having an ability to automatically determine a range to an object detected within a field of view, and to automatically adjust the laser (e.g. illumination intensity, etc.) to reduce a potential risk to the object, may be achieved using a system 300 having separate laser and ranging components 310, 350 that cooperatively perform the desired functionality.

Figure 8:
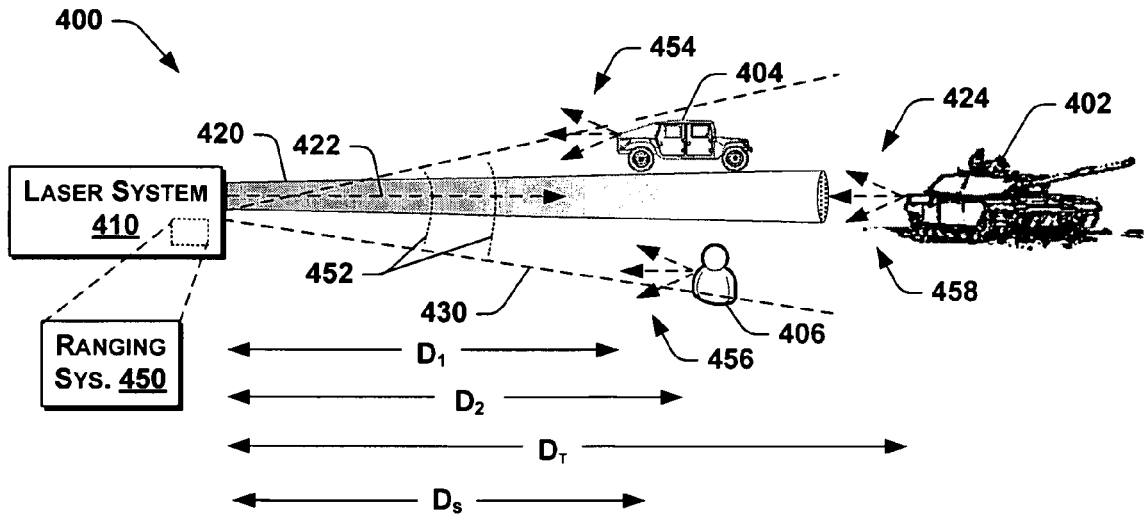
FIG. 8 is an exemplary environment having a laser system in accordance with yet another embodiment of the present disclosure.

FIG. 8 is an exemplary environment 400 having a laser system 410 that includes a ranging system 450 in accordance with yet another embodiment of the present disclosure. The laser system 410 directs a laser beam 420 along a beam axis 422 toward a target 402. At least part of the laser beam 420 that impinges on the target 402 is reflected as target reflections 424 (specular or non-specular) from the target 402 back toward the laser system 410.

In this embodiment, the ranging system 450 monitors for the presence of objects within a field of view 430 that is larger than (and substantially inclusive of) the laser beam 420. For example, in addition to the target 402, a first intermediate object 404 (e.g. a vehicle) and a second intermediate object 406 (e.g. a person) are situated at least partially within the field of view 430. Both intermediate objects 404, 406 are outside the laser beam 430.

Ranging signals 452 are emitted by the ranging system 450 within the field of view 430. First reflected signals 454 are reflected from the first intermediate object 404, second reflected signals 456 are reflected from the second intermediate object 406, and target reflected signals 458 are reflected from the target 402. The ranging system 450 receives at least a portion of the reflected signals 454, 456, 458, and determines a first distance $D_1$ to the first intermediate object 404, a second distance $D_2$ to the second intermediate object 406, and a target distance $D_T$ to the target 402. These distances may then be compared with a standoff distance $D_S$, and necessary adjustments (if any) may be made, as described above.

Embodiments of systems and methods in accordance with the present disclosure having a ranging system that operates using a field of view that is larger than an associated laser beam may provide additional advantages. Because the field of view extends laterally beyond the laser beam, the laser system may detect intermediate objects, and make necessary adjustments to the laser beam, before the intermediate objects actually enter the laser beam. This aspect may be a valuable aspect in some applications, particularly for relatively high power laser applications.

Figure 9:
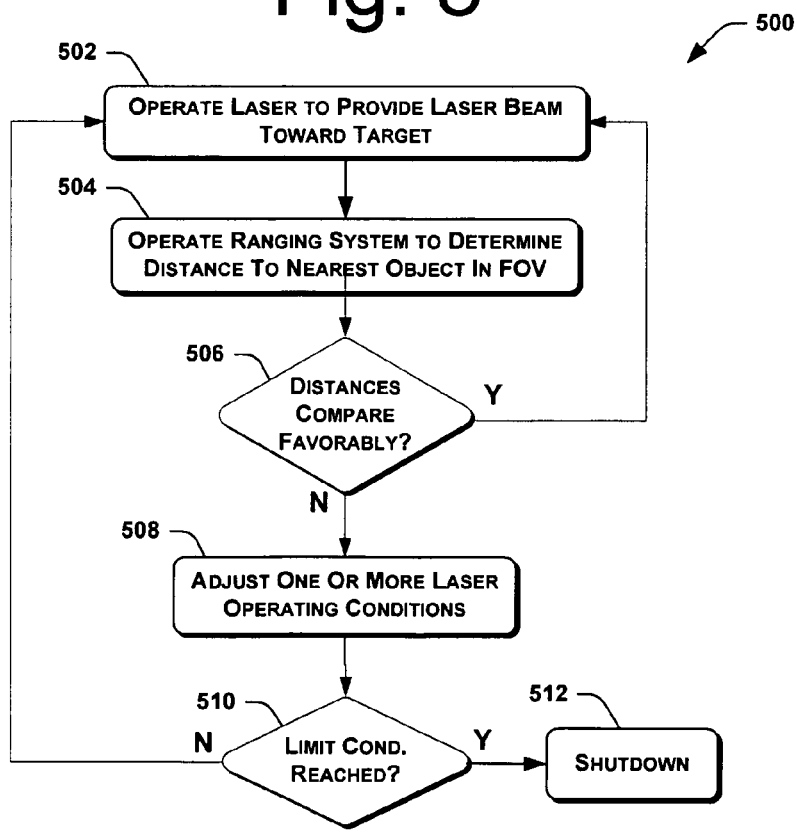
FIG. 9 is a process for operating a laser system in accordance with a further embodiment of the present disclosure.

FIG. 9 is a process 500 for operating a laser system in accordance with a further embodiment of the present disclosure. In this embodiment, the process 500 includes operating a laser system to provide a laser beam toward a target at 502. The operating conditions of the laser system establish a standoff distance. At 504, a ranging system is operated to determine a distance to a nearest object within a field of view (FOV). In some embodiments, the field of view is coincident with the laser beam. Alternately, the field of view may be larger than the laser beam. The ranging system may be operated simultaneously or sequentially with the laser system. In some embodiments, the ranging system provides its own ranging signals, while in other embodiments, the ranging system uses reflected laser light generated by the laser system.

At 506, the process 500 determines whether the distance to the nearest object within the field of view compares favorably with the standoff distance. For example, in some embodiments, the standoff distance is based on the NOHD portion of the laser beam (i.e. the near-range exposure danger zone for human vision), and the distance to the nearest object compares favorably when it is greater than the standoff distance, and compares unfavorably when it is not greater than the standoff distance. If the comparison is favorable (at 506), then the process 500 returns to 502 and continues performing the above-noted activities indefinitely (502 through 506).

On the other hand, if the distance to the nearest object within the field of view compares unfavorably with the standoff distance (at 506), then the process 500 adjusts one or more of the laser operating conditions at 508. For example, in some embodiments, a control system may controllably adjust one or more of a laser source and a beam directing assembly in order to adjust a standoff distance of the laser beam.

Next, after performing the adjustment at 508, the process 500 may determine whether a limit condition has been reached at 510. For example, the process 500 may determine whether some type of lower (or minimum) operating limit has been reached on a laser operating condition (e.g. output power, divergence angle, etc.) so that continued operation of the laser is no longer practical or suitable for its intended purpose. If the determination at 510 is affirmative, the process 500 proceeds to shutdown at 512. Alternately, if no limit condition has been reached (at 510), then the process 500 returns to 502, and continues performing the above-described actions (502 through 510) indefinitely.

It will be appreciated that the process 500 is one possible implementation in accordance with the present disclosure, and that the present disclosure is not limited to the particular process implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Figure 10:
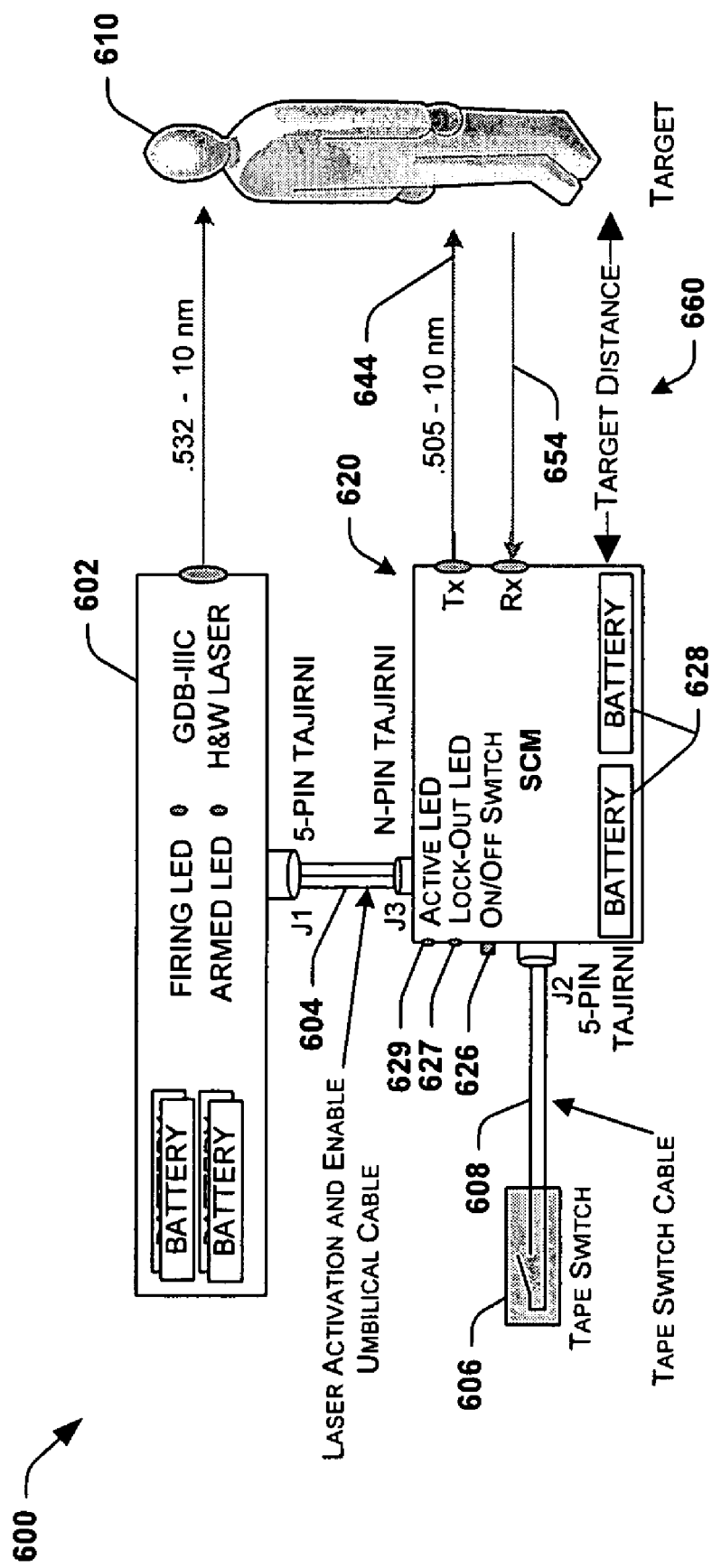
FIG. 10 is a schematic view of a laser system in accordance with another embodiment of the present disclosure.

It will be appreciated that various embodiments of laser systems operable for implementing techniques in accordance with the present disclosure may be conceived. For example, FIG. 10 is a schematic view of a laser system 600 in accordance with another embodiment of the present disclosure. In this embodiment, the laser system 600 includes a warning laser 602 coupled by an umbilical cable 604 to a safety and control module (SCM) 650. In some embodiments, the warning laser 602 may be a visible wavelength laser (e.g. green wavelength, GDB-IIIC H&W laser) configured for directing a warning flash as a non-lethal deterrent toward a target 610. A switch 606 (e.g. a tape switch) is coupled by a switch cable 608 to the safety and control module 620 to enable remote activation (or de-activation) of the safety and control module 620 by an operator (not shown). The safety and control module 620 includes a primary control (or "On/Off") switch 626, a "Lock-Out" LED (Light-Emitting Diode) 627 that may be illuminated to indicate that the safety and control module 620 is in a lock-out or non-operational state, and an "Active" LED 629 that may be illuminated to indicate that the safety and control module 620 is operational. One or more batteries 628 provide power to the safety and control module 620.

Figure 11:
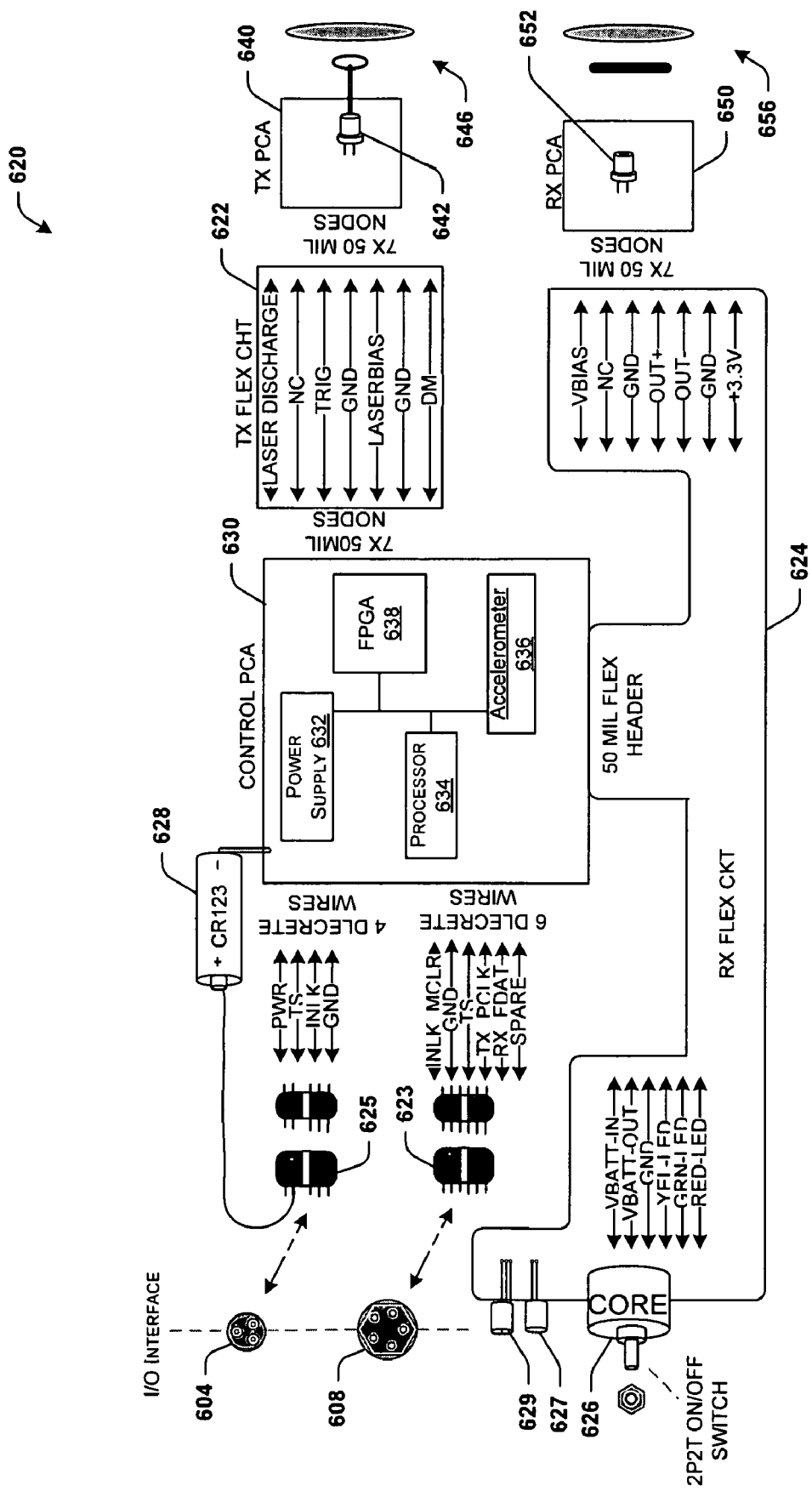
FIG. 11 is a schematic view of a safety and control module of the laser system of FIG. 10 in accordance with another embodiment of the present disclosure.

FIG. 11 is a schematic view of the safety and control module 620 of the laser system 600 of FIG. 10 in accordance with another embodiment of the present disclosure. In this embodiment, the safety and control module 620 includes a primary module (or printed circuit assembly PCA) 630 coupled to a transmission module (or PCA) 640 by a first signal conductor 622. A receiver module 650 is coupled to the primary module 630 by a second signal conductor 624. The primary control (or on/off) switch 626, the Lock-Out LED 627, and the Active LED 629 are also coupled to the primary module 630 by the second signal conductor 624. A first keyed connector 623 couples the primary module 630 to the switch cable 608, and a second keyed connector 625 couples the primary module 630 with the umbilical cable 604.

The transmission module 640 includes a laser source 642. In some embodiments, the laser source 642 may be a laser diode that emits a laser signal 644 (e.g. an infrared 905 nm signal) (shown in FIG. 10) through one or more transmission components 646 (e.g. optical components, etc.) toward the target 610. Similarly, the receiver module 650 includes a sensor 652 that detects a reflected signal 654 (shown in FIG. 10) from the target 610. The reflected signal 654 reaches the sensor 652 via one or more reception components 656 (e.g. optical components, filter, etc.).

As further shown in FIG. 11, in this embodiment, the primary module 630 includes a power supply 632 that provides power to the other components of the primary module 630. A processor 634 receives and processes input signals, such as those from the receiver module 650, and provides corresponding control signals to other components of the safety and control module 620. An accelerometer 636 (e.g. a 3-axis accelerometer) senses movement of the safety and control module 620 and provides corresponding information on the movement of the safety and control module 620 to the processor 634. A field-programmable gate array (FPGA) 638 is operable to receive command signals from the processor 634, and provide corresponding output signals to the transmission module 640.

In operation, the safety and control module 650 is operable to determine a target distance 660 between the laser system 600 and the target 610. More specifically, the primary module 630 of the safety and control module 600 may trigger the transmit module 640 to provide a high voltage pulse to the laser source 642, sending the laser signal 644 to the target 610. The receiver module 650 indicates a detection of the reflected signal 654 to the primary module 630, and the primary module 630 calculates the target distance 660 (e.g. using a time-of-flight model or other suitable technique). If the target distance 660 is less than an acceptable distance (e.g. a Nominal Ocular Hazard Distance (NOHD)), the primary module 630 may adjust (including shut-down) the output of the warning laser 602 to avoid potential harm to the target 610.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the present disclosure. Accordingly, the scope of the invention should be determined from the following claims.

What is claimed is:

1. A control module assembly for adjusting an output of a laser, comprising:
   an emitter emitting a ranging beam of continuous periodic pulses toward a target;
   a detector configured to receive a reflected ranging beam from the target; and
   a control module operable to communicate with the laser, the emitter and the detector to determine a distance to the target, to determine a reference distance based on one or more operating conditions of the laser, the reference distance being based at least partially on a distance associated with harm to human vision, to compare the distance to the target with the reference distance, and adjust one or more operating conditions of the laser to adjust the reference distance if the distance to the target is less than the reference distance.

2. The assembly of claim 1, wherein the output of the laser comprises a pulse operating at a visible wavelength.

3. The assembly of claim 2, wherein the ranging beam comprises a non-visible beam operating at a non-visible wavelength.

4. The assembly of claim 1, wherein the control module is further operable to detect a movement of the control module, and to provide a control signal to controllably adjust one or more operating conditions of the output of the laser based on the movement.

5. The assembly of claim 1 wherein the control module includes an accelerometer operable to detect the movement of the control module.

6. The assembly of claim 1, further comprising a remote switch operatively coupled to the control module and operable to enable remote control of the control module.

7. The assembly of claim 1, wherein the reference distance is a nominal ocular hazard distance (NOHD).

8. The assembly of claim 1, wherein the control module is operable to determine the distance to the target based on one or more of a time of flight method, a triangulation method, and a modulation method.

9. A method for adjusting an output of a laser, comprising:
   emitting a ranging beam of continuous periodic pulses toward a target from an emitter;
   receiving a reflected ranging beam from the target by a detector;
   communicating with the laser, the emitter, and the detector with a controller;
   determining a distance to the target using the reflected ranging beam;

determining a reference distance based on one or more operating conditions of the laser, the reference distance being based at least partially on a distance associated with harm to human vision;

comparing the distance to the target with the reference distance with the controller; and adjusting one or more operating conditions of the laser to adjust the reference distance if the distance to the target is less than the reference distance.

10. The method of claim 9, wherein receiving a reflected ranging beam from the target includes receiving a portion of the ranging beam that is reflected from the target.

11. The method of claim 9, wherein emitting a ranging beam toward a target includes emitting one or more pulses toward the target, and wherein receiving a reflected ranging beam from the target includes receiving one or more reflected pulses.

12. The method of claim 9, wherein controllably adjusting one or more operating conditions of the laser comprises controllably adjusting the laser operating at a visible wavelength.

13. The method of claim 12, wherein controllably adjusting one or more operating conditions of the laser operating at a visible wavelength comprises having an intensity configured to dazzle an observer located at the target.

14. The method of claim 12, wherein emitting a ranging beam toward a target comprises emitting a non-visible ranging beam toward the target.

15. The method of claim 14, wherein emitting a non-visible ranging beam toward the target comprises emitting an infrared ranging beam toward the target.

16. The method of claim 9, wherein controllably adjusting one or more operating conditions of the laser includes controllably adjusting one or more of a laser output power, an intensity, and a divergence angle of the output of the laser.

17. The method of claim 9, wherein determining a reference distance includes determining a nominal ocular hazard distance (NOHD) based on one or more operating conditions of the laser.

18. The method of claim 17, wherein controllably adjusting one or more operating conditions of the laser to adjust the reference distance includes controllably adjusting one or more aspects of the operating conditions of the laser to cause the distance to the target to be greater than the NOHD.

19. The method of claim 9, wherein determining a distance to the target includes one or more of a time of flight method, a triangulation method, and a modulation method.

20. The assembly of claim 2, wherein the control module is further configured to determine the reference distance based at least partially on the distance associated with harm to human vision and based at least partially on one or more operating conditions of the emitter.

* * * * *